(12) United States Patent
Wang et al.

(10) Patent No.: US 12,054,023 B2
(45) Date of Patent: Aug. 6, 2024

(54) HYBRID-ELECTROMAGNETIC SUSPENSION CAPABLE OF SELF-POWERING AND CONTROL METHOD THEREOF

(71) Applicant: Jiangsu University, Jiangsu (CN)

(72) Inventors: Ruochen Wang, Jiangsu (CN); Wei Liu, Jiangsu (CN); Renkai Ding, Jiangsu (CN); Yingfeng Cai, Jiangsu (CN); Long Chen, Jiangsu (CN)

(73) Assignee: Jiangsu University, Jiangsu (CN)

( * ) Notice: Subject to any disclaimer, the term of this patent is extended or adjusted under 35 U.S.C. 154(b) by 745 days.

(21) Appl. No.: 16/607,821

(22) PCT Filed: Nov. 2, 2018

(86) PCT No.: PCT/CN2018/113548
§ 371 (c)(1),
(2) Date: Oct. 26, 2021

(87) PCT Pub. No.: WO2020/024471
PCT Pub. Date: Feb. 6, 2020

(65) Prior Publication Data
US 2021/0339594 A1    Nov. 4, 2021

(30) Foreign Application Priority Data

Jul. 30, 2018   (CN) .......................... 201810851588.X

(51) Int. Cl.
*B60G 17/018*   (2006.01)
*B60G 15/12*   (2006.01)
(Continued)

(52) U.S. Cl.
CPC ......... *B60G 17/0165* (2013.01); *B60G 15/12* (2013.01); *B60G 17/0152* (2013.01);
(Continued)

(58) Field of Classification Search
CPC ................ B60G 17/0165; B60G 15/12; B60G 17/0152; B60G 17/018; B60G 2202/154;
(Continued)

(56) References Cited

U.S. PATENT DOCUMENTS 5,174,598 A    12/1992  Sato et al.
5,276,621 A *  1/1994   Henry ................ B60G 17/0157
                                                    280/5.52
(Continued)

FOREIGN PATENT DOCUMENTS

CN        101821119 A     9/2010
CN        102481821 A     5/2012
(Continued)

*Primary Examiner* — Adam M Alharbi
(74) *Attorney, Agent, or Firm* — Hartman Global IP Law; Gary M. Hartman; Domenica N.S. Hartman

(57) ABSTRACT

Provided is a hybrid electromagnetic suspension capable of self-powering and a control method thereof. The hybrid electromagnetic suspension includes an integrated structure of linear motor and cylinder block of equivalent hydraulic damper, a suspension spring, a connecting pipeline, a hydraulic rectifier bridge, an accumulator, a hydraulic motor and a rotary motor. The upper and lower chambers of the working cylinder, the lower chamber of working cylinder and oil storage cylinder are connected through the hydraulic rectifier bridge and the pipeline. The control has three modes including passive mode, semi-active mode and active mode. The ECU detects the road level according to the received sensor signal, and switches to the corresponding mode to control the suspension according to obtained road level, so as to obtain the optimal suspension performance under each road level. In the device of the invention, the linear motor and the equivalent hydraulic damper recover the vibration energy together in the case of good road condition; the linear motor and the equivalent hydraulic damper attenuate the suspension vibration together in the case of poor road (Continued)

surface, and at the same time the equivalent hydraulic damper also recovers the vibration energy, thus the self-powering can be realized.

3 Claims, 11 Drawing Sheets

(51) Int. Cl.
  *B60G 17/015* (2006.01)
  *B60G 17/0165* (2006.01)
(52) U.S. Cl.
  CPC ...... *B60G 17/018* (2013.01); *B60G 2202/154* (2013.01); *B60G 2202/24* (2013.01); *B60G 2202/413* (2013.01); *B60G 2202/442* (2013.01); *B60G 2400/102* (2013.01); *B60G 2400/821* (2013.01); *B60G 2600/184* (2013.01); *B60G 2600/1877* (2013.01); *B60G 2600/24* (2013.01)
(58) Field of Classification Search
  CPC .......... B60G 2202/24; B60G 2202/413; B60G 2202/442; B60G 2400/102; B60G 2400/821; B60G 2600/184; B60G 2600/1877; B60G 2600/24
  See application file for complete search history.

(56) References Cited

U.S. PATENT DOCUMENTS

| | | | |
|---|---|---|---|
| 2009/0079145 | A1* | 3/2009 | Inoue ................... B60G 15/063 267/140.14 |
| 2011/0218707 | A1 | 9/2011 | Inoue et al. |
| 2012/0303193 | A1 | 11/2012 | Gresser |
| 2017/0267051 | A1 | 9/2017 | Toyohira et al. |

FOREIGN PATENT DOCUMENTS

| | | |
|---|---|---|
| CN | 107351612 A | 11/2017 |
| CN | 207388788 U | 5/2018 |
| CN | 109080399 A | 12/2018 |

* cited by examiner

HYBRID-ELECTROMAGNETIC SUSPENSION CAPABLE OF SELF-POWERING AND CONTROL METHOD THEREOF

CROSS REFERENCE TO RELATED APPLICATIONS

This application claims the benefit of International Application No. PCT/CN2018/113548, filed Nov. 2, 2018, having a priority claim to Chinese Patent Application No. 201810851588.X, filed Jul. 30, 2018. The contents of these prior patent documents are incorporated herein by reference.

TECHNICAL FIELD

The present invention relates to a hybrid electromagnetic suspension capable of self-powering and a control method thereof, which belong to the technical field of vehicle suspension.

TECHNICAL BACKGROUND

Recent years, with the increasingly serious problems of environmental pollution and energy shortage, energy saving and emission reduction in the vehicle industry is imperative. According to reliable statistics, the energy loss of the vehicle vibration accounts for 17.2% of the total energy loss of vehicle. Thus, experts and scholars at home and abroad have focused their research on vehicle vibration energy recovery. In traditional passive suspension, this energy is dissipated in the form of heat energy through friction motion of hydraulic damper to attenuate vibration and improve vehicle ride comfort. Compared with passive suspension, although the vibration reduction performance of semi-active suspension and active suspension is improved, the vibration energy still cannot be recovered and the active suspension needs additional external energy consumption. If this energy can be recycled, the energy consumption of the vehicle can be reduced, and the fuel economy can be improved, thus the goal of energy saving and emission reduction can be achieved.

CONTENTS OF THE INVENTION

The object of the present invention is to provide a hybrid electromagnetic suspension capable of self-powering and a control method thereof, which not only improve the ride comfort of the suspension, but also reduce the vibration energy loss of the suspension, so as to realize the self-powering of suspension.

In order to realize the above invention, the technical scheme adopted by the present invention is as follows: a hybrid electromagnetic suspension capable of self-powering, which includes an oil storage cylinder, which is internally nested with a working cylinder. The oil storage cylinder and the upper end of the working cylinder are fixed together by a pressure shield cover. The outer wall of the oil storage cylinder is connected with an inner sleeve of the linear motor through a sliding pair. An upper-end cover of the inner sleeve of the linear motor is installed at the upper end of the inner sleeve of the linear motor. The piston is installed in the working cylinder. A piston rod is fixed on the piston. The piston rod passes through both the pressure shield cover and the upper-end cover of the inner sleeve of the linear motor, and then is fixed and connected with the upper-end cover of the inner sleeve of the linear motor. The inner sleeve of the linear motor is located inside an outer sleeve of the linear motor, and a permanent magnet, an iron core and an excitation coil are installed between the inner sleeve of the linear motor and the outer sleeve of the linear motor. The bottom of the working cylinder is provided with a first pipeline of working cylinder and a second pipeline of working cylinder. The bottom of the oil storage cylinder is provided with an oil storage cylinder pipeline. The piston rod is provided with a piston rod pipe hole. One end of the piston rod pipe hole is connected with the rod side of the working cylinder. The other end of the piston pipe hole and the first pipeline of the working cylinder are both connected to the pipeline of a first energy feeding unit. The second pipeline of the working cylinder and the oil storage cylinder pipeline are both connected to the pipeline of the second energy feeding unit.

In the above solution, the first energy feeding unit includes a first rectifier bridge, a first accumulator, a second accumulator, a first hydraulic motor, a first rotary motor, a first rectifier circuit, a first boost circuit and a battery. The first rectifier bridge includes a first one-way valve, a second one-way valve, a third one-way valve and a fourth one-way valve. The first one-way valve is opposite to the second one-way valve, and the third one-way valve is opposite to the fourth one-way valve. The upper chamber of the working cylinder is connected to the pipeline between the second one-way valve and the third one-way valve through the piston rod pipe hole. The lower chamber of the working cylinder is connected to the pipeline between the first one-way valve and the fourth one-way valve through the first pipeline of working cylinder. The first accumulator is connected to the pipeline between the first one-way valve and the second one-way valve. The second accumulator is connected to the pipeline between the third one-way valve and the fourth one-way valve. The two ends of the first hydraulic motor are respectively connected to the first accumulator and the second accumulator. The first hydraulic motor, the first rotary motor, the first rectifying circuit, the first boost circuit and the battery are connected in turn.

In the above solution, the second energy feeding unit includes a second rectifier bridge, a third accumulator, a fourth accumulator, a second hydraulic motor, a second rotary motor, a second rectifier circuit, a second boost circuit and a battery. The second rectifier bridge includes a fifth one-way valve, a sixth one-way valve, a seventh one-way valve and an eighth one-way valve. The fifth one-way valve is opposite to the sixth one-way valve, and the seventh one-way valve is opposite to the eighth one-way valve. The lower chamber of the working cylinder is connected to the pipeline between the sixth one-way valve and the seventh one-way valve through the second pipeline of the working cylinder. The oil storage cylinder is connected through the oil storage cylinder pipeline to the pipeline between the fifth one-way valve and the eighth one-way valve. The third accumulator is connected to the pipeline between the fifth one-way valve and the sixth one-way valve. The fourth accumulator is connected to the pipeline between the seventh one-way valve and the eighth one-way valve. The two ends of the second hydraulic motor are respectively connected to the third accumulator and the fourth accumulator. The second hydraulic motor, the second rotary motor, the second rectifying circuit, the second boost circuit and the battery are connected in turn.

In the above solution, a guider is installed below the pressure shield cover, and the guider is located between the oil storage cylinder and the working cylinder. A skeleton oil seal is mounted on the guider.

In the above solution, the permanent magnet is evenly arranged in the inner side of the outer sleeve of the linear motor along the axis. Two adjacent permanent magnets are separated by iron cores. A coil bushing is sleeved in the groove of the inner sleeve of the linear motor. The excitation coil is evenly wound on the coil bushing. The upper end of the inner sleeve of the linear motor is provided with a wire slot along the axis.

The present invention also provides a control method of hybrid electromagnetic suspension capable of self-powering, which divides three suspension working modes: passive mode, semi-active mode and active mode, according to the performance requirements of vehicles under different road levels.

In the above solution: 1) when the detected road level is A-class or B-class, the hybrid electromagnetic suspension works in passive mode; 2) when the detected road level is C-class, the hybrid electromagnetic suspension works in semi-active mode; 3) when the detected road level is D-class, E-class or F-class, the hybrid electromagnetic suspension works in active mode.

In the above solution, the road level is obtained by calculating the IRI (International Roughness Index), and then by comparing with the classification table of road roughness index. The calculation method of IRI is as follows:

International Roughness Index:

$$IRI = \frac{\sqrt{2\int_0^\infty |H(f)|^2 PSD_{ROAD}(\omega)} - 0.013}{0.5926}$$

$$PSD_{ROAD}(\omega) = PSD_{ACC}(\omega) \cdot H(\omega)$$

$$|H(\omega)| = \omega^2 \left| \frac{k_1(j\omega c + k_2)}{(-\omega^2 m_2 + j\omega c + k_2)(-\omega^2 m_1 + j\omega c + k_1) - (j\omega c + k_1)(j\omega c + k_2)} \right|$$

where, $PSD_{ROAD}$ is the power spectral density of road; $PSD_{ACC}(\omega)$ is the power spectral density of body acceleration; $H(\omega)$ is the transfer function from road input to body acceleration; $\omega$ is circumferential frequency; $m_2$ is the sprung mass; $m_1$ is the unsprung mass; $k_2$ is spring stiffness; $k_1$ is tire stiffness; $c$ is the damper coefficient of shock absorber.

In the above solution, in the active mode, the dynamic performance of the vehicle is satisfied by adaptive switching of the skyhook controller, according to the detected real-time road level.

In the above scheme, the process of the adaptive switching of the skyhook controller is as follows:

S1: Establishment of ¼ vehicle suspension model, $$\begin{cases} m_2\ddot{x}_2 = -k_2(x_2 - x_1) + F \\ m_1\ddot{x}_1 = k_2(x_2 - x_1) - k_1(x_1 - x_0) - F \end{cases}$$

where, $m_2$ is the sprung mass; $m_1$ is the unsprung mass; $k_2$ is spring stiffness; $k_1$ is tire stiffness; $x_0$, $x_1$, $x_2$ are the road input, vertical displacement of unsprung mass and vertical displacement of sprung mass respectively; F is the output force of actuator (including linear motor and equivalent hydraulic damper). When the modified skyhook control is adopted, it can be expressed as follows:

$$F = \begin{cases} -c_s \cdot \dot{x}_2 - c_p(x_2 - x_1) & \dot{x}_2 \cdot (\dot{x}_2 - \dot{x}_1) \leq 0 \\ -c_p(x_2 - x_1) & \dot{x}_2 \cdot (\dot{x}_2 - \dot{x}_1) > 0 \end{cases}$$

where, $c_s$ is the skyhook damping coefficient; $c_p$ is the passive damping coefficient.

S2: Determination of the parameters of the skyhook controller:

different suspension performances can be obtained by choosing different skyhook damping coefficient $c_s$ and passive damping coefficient $c_p$. To satisfy the performance requirements under different road levels, the weighted coefficients of handling performance $w_t$ and the weighted coefficients of ride comfort $w_a$ are introduced. With the increase of $w_t$, the weight of dynamic tire load in the comprehensive evaluation index increases, and the better handling performance can be obtained. Similarly, with the increase of the $w_a$, the weight of body acceleration in the comprehensive evaluation index increases, and the better ride comfort can be obtained.

$$(C_s, C_p)_{optimal} = J = \min \left\{ \sqrt{\left[w_t\left(\frac{rms(f) - rms(f)_{min}}{rms(f)_{max} - rms(f)_{min}}\right)\right]^2 + \left[w_a\left(\frac{rms(a) - rms(a)_{min}}{rms(a)_{max} - rms(a)_{min}}\right)\right]^2} \right\}$$

where, rms(a) is the root mean square value of body acceleration; rms(f) is the root mean square value of dynamic tire load; rms(a)$_{min}$ and rms(a)$_{max}$ are the minimum and maximum values of the root mean square value of body acceleration respectively; rms(f)$_{min}$ and rms(f)$_{max}$ are the minimum and maximum values of the root mean square value of dynamic tire load respectively. According to the requirements of different road levels for vehicle performance, the comprehensive evaluation index J under the corresponding performance requirements can be formed by adjusting the values of $w_t$ and $w_a$. Through optimization algorithm, the parameters of the skyhook controller under the corresponding road level including the skyhook damper coefficient $c_s$ and passive damper coefficient $c_p$, which make the comprehensive evaluation index J the smallest i.e. the corresponding vehicle performance optimal, are obtained. The passive damping coefficient $c_p$ can be used to calculate the resistance value required for the external resistor.

The beneficial effects of the present invention are as follows: (1) The present invention not only solves the problem that the parameters of passive suspension cannot be adjusted, but also solves the problem of large energy consumption of active suspension. The working mode of the suspension can be switched according to the requirements of driving conditions. The suspension system has Fail-Safe characteristics because of the parallel structure of linear motor and equivalent hydraulic damper. Its control mechanism is simple in structure and has beneficial engineering application value. (2) The hybrid electromagnetic suspension provided by the present invention divides the working mode according to the road level, and designs the controller under the corresponding mode, so as to improve the performance of the suspension under different working conditions. When the vehicle runs on the A-class or B-class road, the suspension works in passive mode, and the system has good feeding capability. When the vehicle runs on the C-class road, the suspension works in semi-active mode which cannot only improve the ride comfort of vehicles, but also realize energy recovery i.e. the system has good comprehensive performance under this mode. When the vehicle runs on the D-class, E-class or F-class road, the suspension works in active mode which makes the system have good dynamic performance. Whether the suspension works in the "passive", "semi-active" or "active" mode, the hydraulic oil in the pipeline always drives the hydraulic motor to rotate, thus driving the rotating motor to generate electricity. Synthesizing the vibration energy recovered by the linear motor, the system can realize self-powering. (3) This present invention can adaptively switch the suspension control strategy to ensure the optimal suspension performance according to the detected road level. Whether the control strategy is employed, the suspension can achieve vibration energy recovery, and its comprehensive performance is good.

DESCRIPTION OF FIGURES

The following is a further explanation of this invention through the figures and embodiments.

DESCRIPTION OF FIGURES

1. Upper lifting lug; 2. Piston rod pipe hole; 3. Piston rod; 4. Upper-end cover of the inner sleeve of the linear motor; 5. Inner sleeve of the linear motor; 6. Pressure shield cover; 7. Skeleton oil seal; 8. Guider; 9. First blocking ring; 10. First sliding bearing; 11. Upper end cover; 12. Outer sleeve of the linear motor; 13. Permanent magnet; 14. Iron core; 15. Excitation coil; 16. Coil bushing; 17. Oil storage cylinder; 18. Working cylinder; 19. Piston; 20. Second sliding bearing; 21. Second blocking ring; 22. Lower end cover; 23. Third sliding bearing; 24. Third blocking ring; 25. Support ring; 26. First pipeline of working cylinder; 27. Oil storage cylinder pipeline; 28. Lower lifting lug; 29. Second pipeline of working cylinder; 30. Wire slot; 31. First one-way valve; 32. Second one-way valve; 33. Third one-way valve; 34. Forth one-way valve; 35. First accumulator; 36. Second accumulator; 37. First hydraulic motor; 38. First rotary motor; 39. First rectifier circuit; 40. First boost circuit; 41. Battery; 42. Second boost circuit; 43. Second rectifier circuit; 44. Second rotary motor; 45. Second hydraulic motor; 46. Third accumulator; 47. Forth accumulator; 48. Fifth one-way valve; 49. Sixth one-way valve; 50. Seventh one-way valve; 51. Eighth one-way valve.

DETAILED DESCRIPTION

The present invention is further described through figures and embodiments, but the scope of protection of the present invention is not limited thereto.

Figure 2:
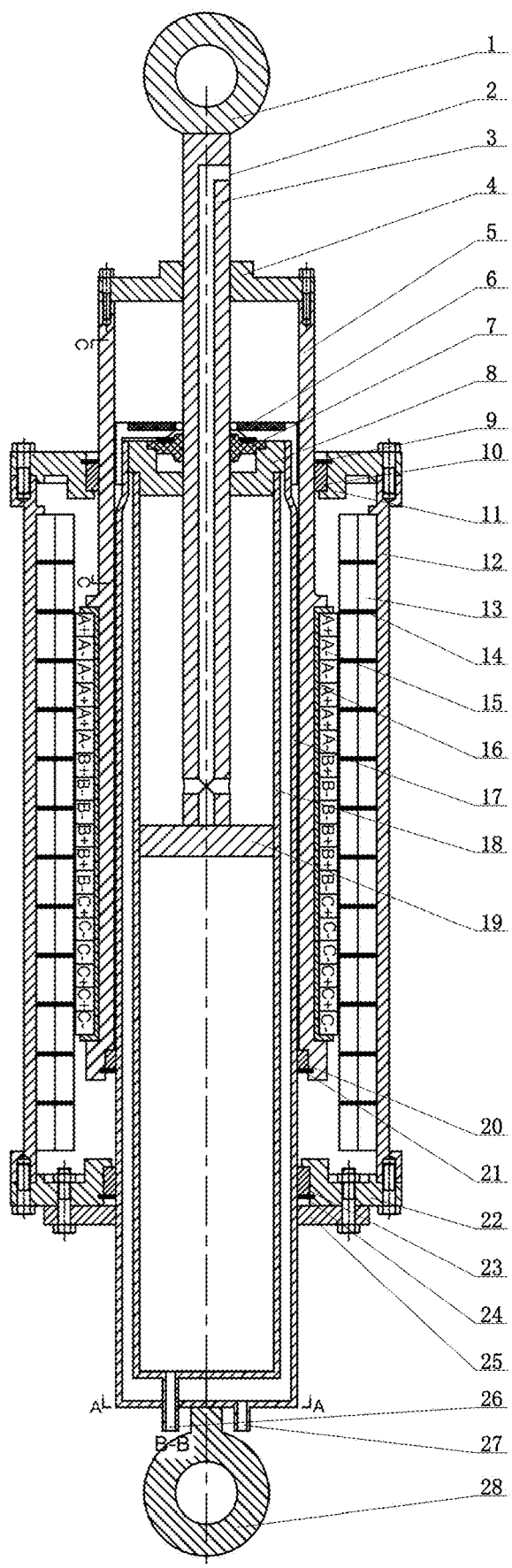
FIG. 2 is an integrated diagram of a linear motor and an equivalent "hydraulic damper" of the hybrid electromagnetic suspension.
Figure 3:
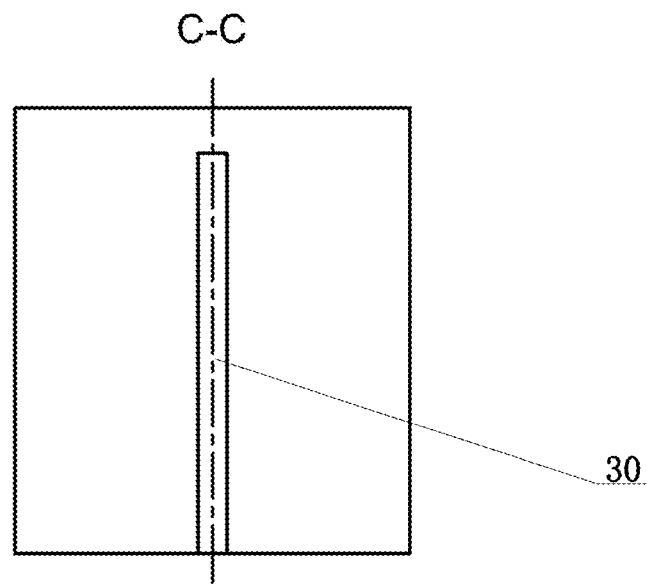
FIG. 3 is a C-C structural diagram of FIG. 2.
Figure 4:
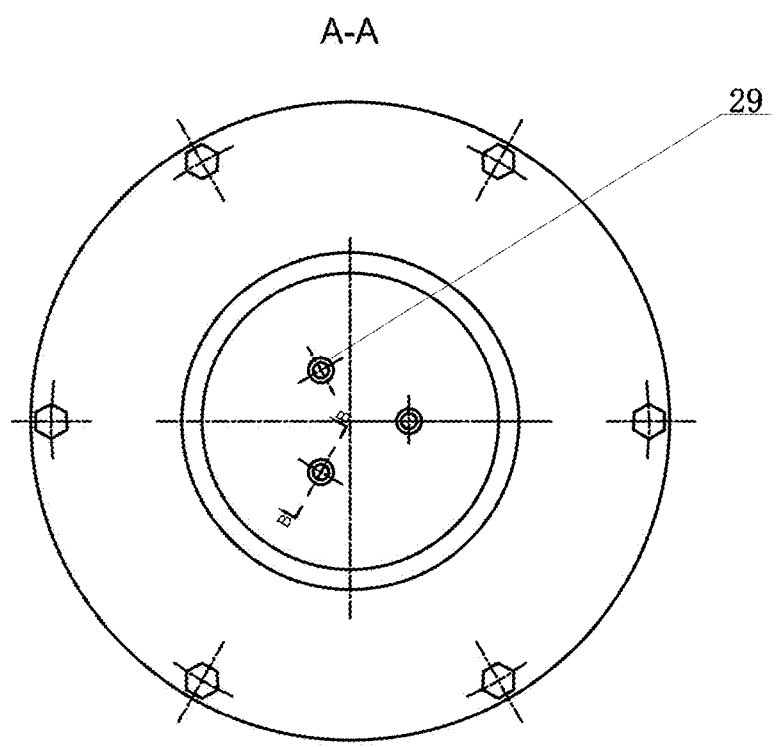
FIG. 4 is an A-A structural diagram of FIG. 2.

As shown in FIGS. 2, 3 and 4, the hybrid electromagnetic suspension capable of self-powering is provided, the upper lifting lug 1 is hinged with the upper end of the piston rod 3. The piston rod 3 has a semi-deep blind hole in the upper end and a through hole in the lower end, both along the radial direction, and a long-deep hole along the axis direction. Three holes are interconnected to form a pipeline 2. The piston rod 3 passes through the upper cover of inner sleeve of linear motor 4 and is welded with it. The working cylinder 18 is installed in the oil storage cylinder 17 through the pressure shield cover 6 and the guider 8. The skeleton oil seal 7 is installed between the pressure shield cover 6 and the guider 8. The bottom of the working cylinder is provided with a first pipeline 26 of working cylinder and a second pipeline 29 of working cylinder which respectively pass through the round holes at the bottom of the oil storage cylinder 17. The bottom of the oil storage cylinder 17 is provided with an oil storage cylinder pipeline 27. The upper end of the inner sleeve 5 of the linear motor is fixed with the upper end cover of the inner sleeve 4 of the linear motor through bolts, and the lower end is assembled outside the oil storage cylinder 17 through the sliding bearing 20. The second blocking ring 21 is installed at the lower end of the second sliding bearing 20. A coil bushing 16 is assembled on the outer side of inner sleeve 5 of linear motor. An excitation coil 15 is evenly wound on the coil bushing 16 and connected with the external circuit through the wire slot 30. The support ring 25 is assembled at the lower end of the oil storage cylinder and welded with it. The two ends of the outer sleeve 12 of the linear motor are connected with the upper cover 11 and the lower cover 22 respectively by bolts. The upper cover 11 is assembled on the outer side of the inner sleeve 5 of the linear motor through the first sliding bearing 10. The upper end of the first sliding bearing 10 is equipped with the first blocking ring 9. The lower cover 22 is assembled on the outer side of the oil storage cylinder 17 through the third sliding bearing 23. The third blocking ring 24 is installed at the lower end of the third sliding bearing 23. The lower end cover 22 is connected with the support ring 25 through bolts. The ring permanent magnet 13 is fixed on the inside of the outer sleeve 12 of the linear motor, and there is a ring iron core 14 between each of the two ring permanent magnets 13.

Figure 1:
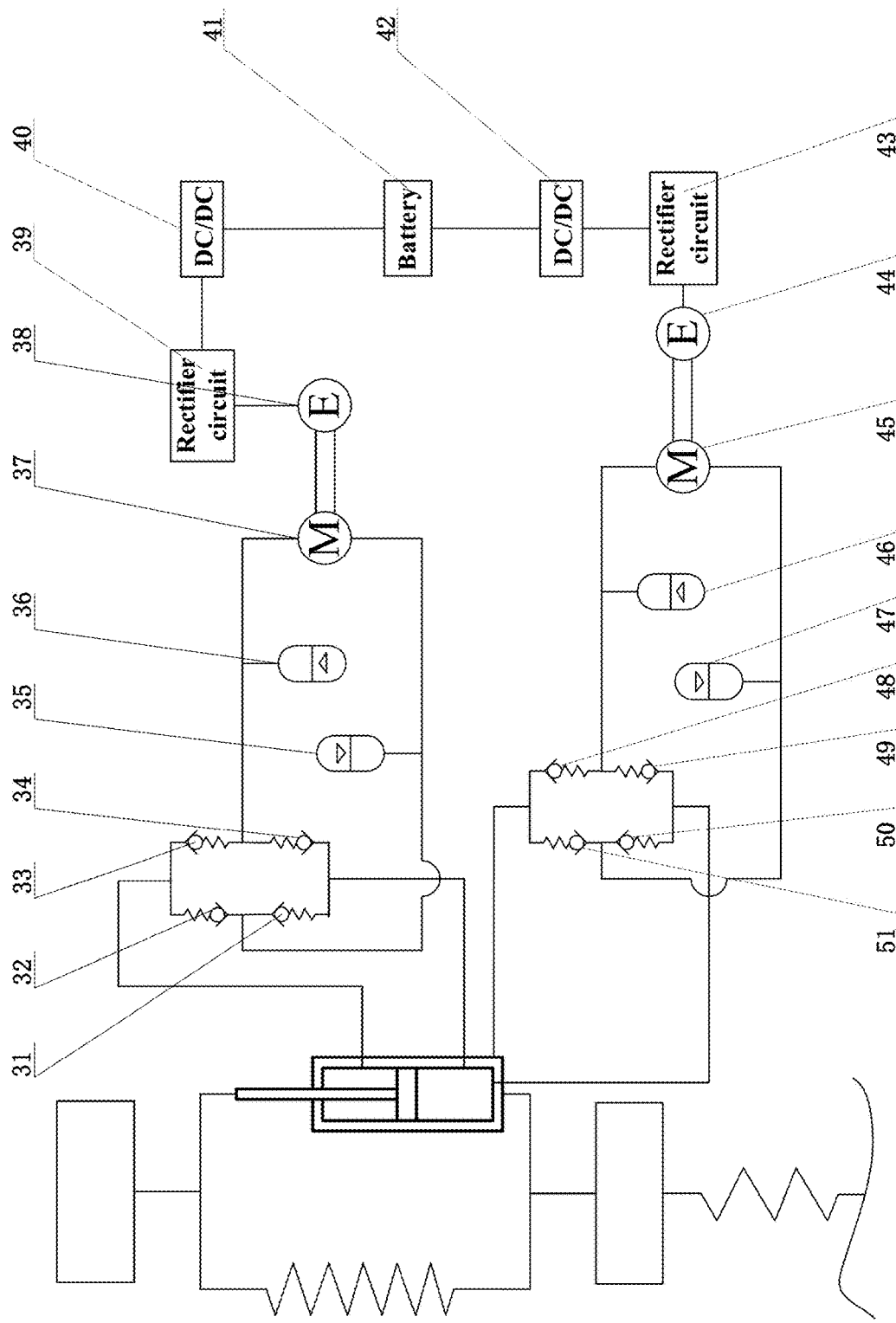
FIG. 1 is a schematic diagram of the hybrid electromagnetic suspension capable of self-powering.

As shown in FIG. 1, the first one-way valve 31, the second one-way valve 32, the third one-way valve 33 and the fourth one-way valve 34 are connected in turn to form the first rectification bridge. The upper chamber of the working cylinder 18 is connected to the pipeline between the second one-way valve 32 and the third one-way valve 33 through the pipeline 2. The lower chamber of the working cylinder 18 is connected to the pipeline between the first one-way valve 31 and the fourth one-way valve 34 through the first pipeline of working cylinder 26. The first accumulator 35 is connected to the pipeline between the first and second one-way valves, and the second accumulator 36 is connected to the pipeline between the third and fourth one-way valves. The first hydraulic motor 37, the first rotary motor 38, the first rectifier circuit 39, the first boost circuit 40 and the battery 41 are connected in turn to form the first energy feeding unit. The fifth one-way valve 48, the sixth one-way valve 49, the seventh one-way valve 50 and the eighth one-way valve 51 are connected in turn to form the second rectification bridge. The lower chamber of the working cylinder 18 is connected to the pipeline between the sixth and seventh one-way valves through the external pipeline of second pipeline of working cylinder 29. The oil storage cylinder 17 is connected to the pipeline between the fifth and eighth one-way valves through the external pipeline of oil storage cylinder pipeline 27. The third accumulator 46 is connected to the pipeline between the fifth and sixth one-way valves, and the fourth accumulator 47 is connected to the pipeline between the seventh and eighth one-way valves. The second hydraulic motor 45, the second rotary motor 44, the second rectifier circuit 43, the second boost circuit 42 and the battery 41 are connected in turn to form the second energy feeding unit. The upper lifting lug 1 is connected with the body and the lower lifting lug 28 is connected with the wheel. The other parts of FIG. 1 are arranged on the body of the vehicle, through which the installation of the hybrid electromagnetic suspension capable of self-powering is realized.

Figure 5:
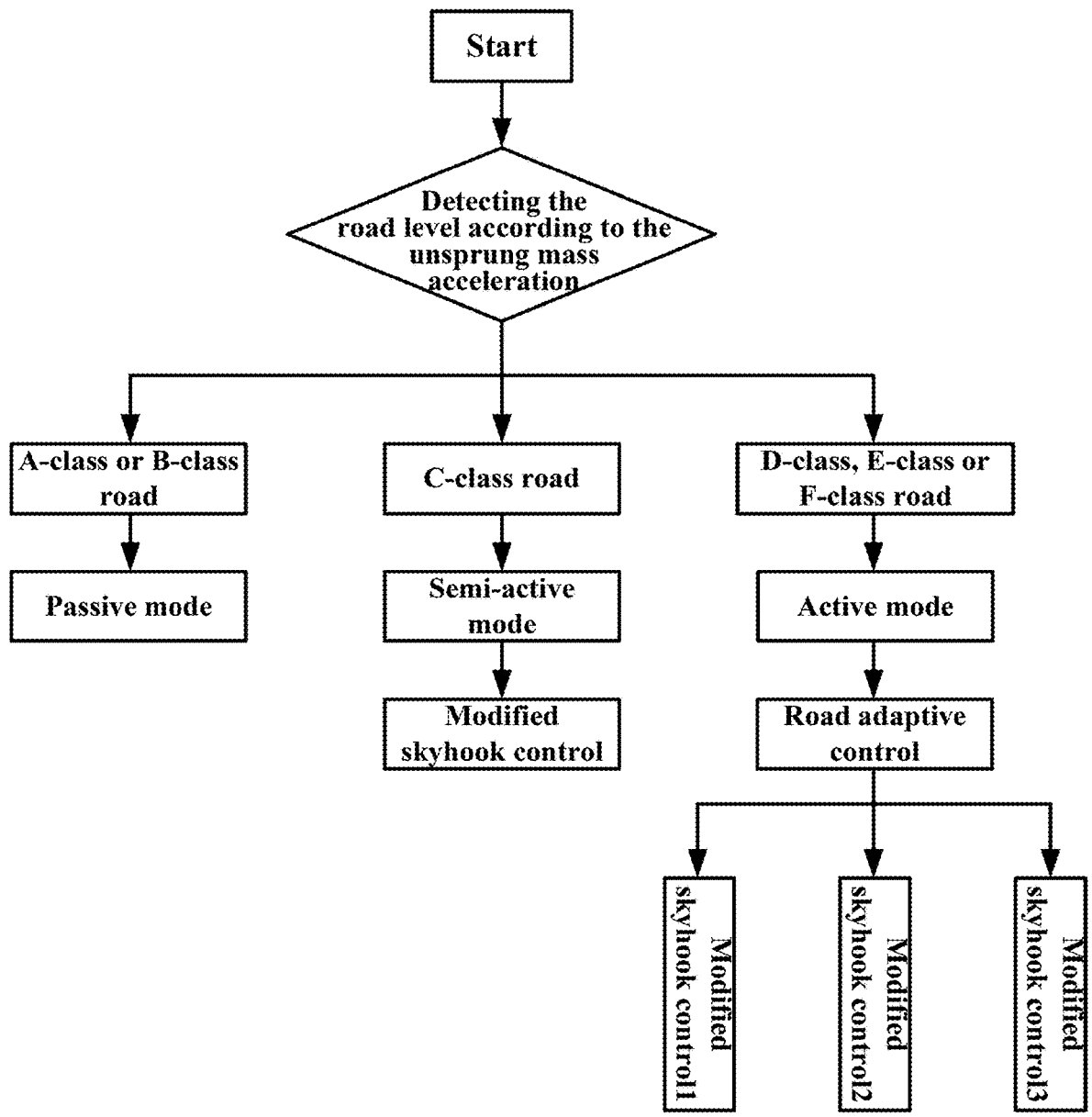
FIG. 5 is a control flow chart of the hybrid electromagnetic suspension.

As shown in FIG. 5, the method for controlling the hybrid electromagnetic suspension capable of self-powering can be described as follows: according to the performance requirements under different driving conditions, three suspension working modes are classified, which are passive mode, semi-active mode and active mode. Energy recovery is the goal of passive mode, in which linear motors are used as generators to recover energy, and equivalent hydraulic damper works with fixed damping. Coordinating the dynamic performance and energy recovery performance is the objective of semi-active mode. In this mode, the linear motor recovers vibration energy, and the equivalent hydraulic damper changes the damping value in real time according to the driving conditions to carry out semi-active control. The dynamic performance is the control target of active mode, in which the linear motor is used as a motor to attenuated suspension vibration together with equivalent hydraulic damper.

Figure 6:
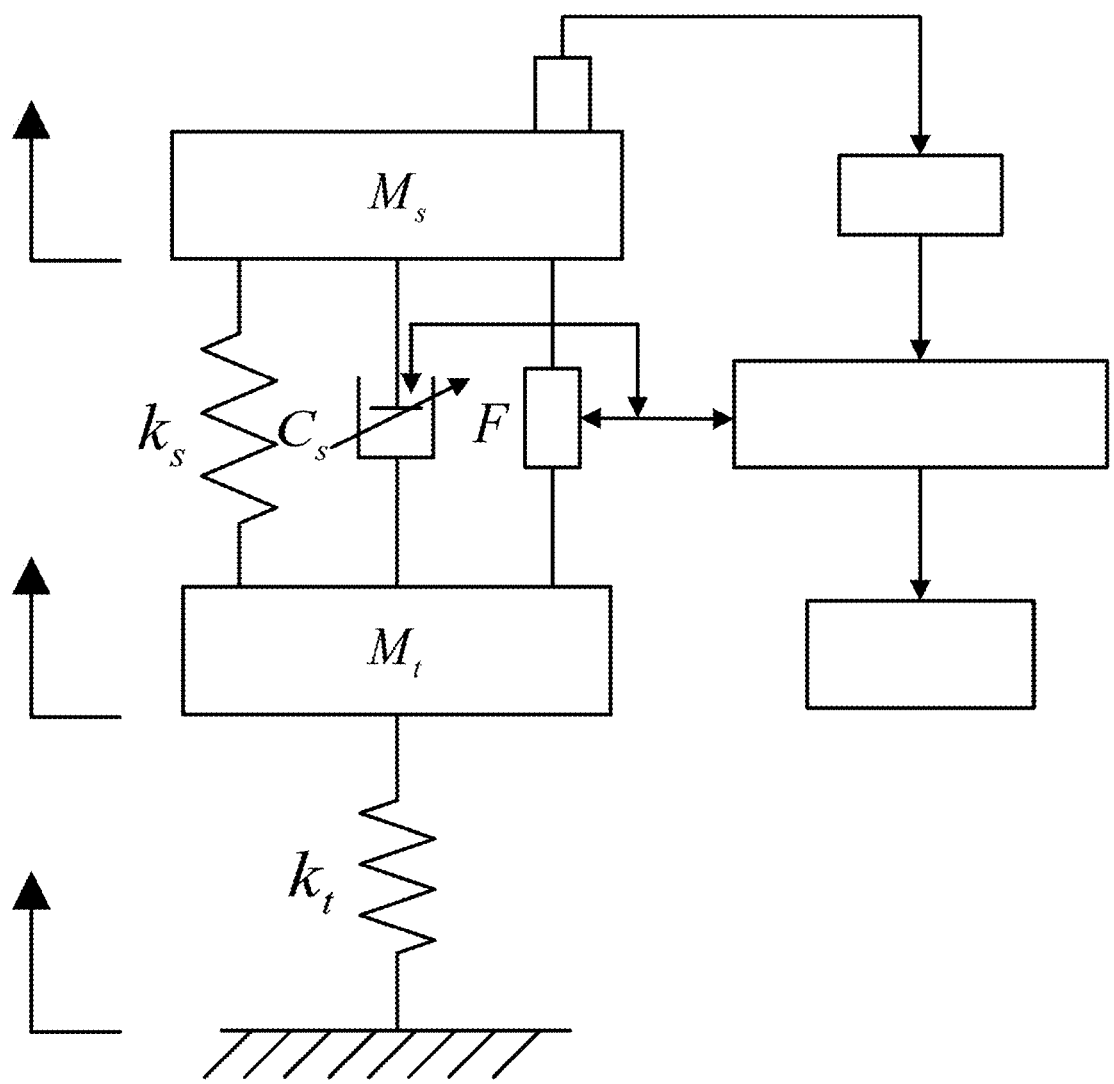
FIG. 6 is a working principle diagram of the hybrid electromagnetic suspension.
Figure 7:
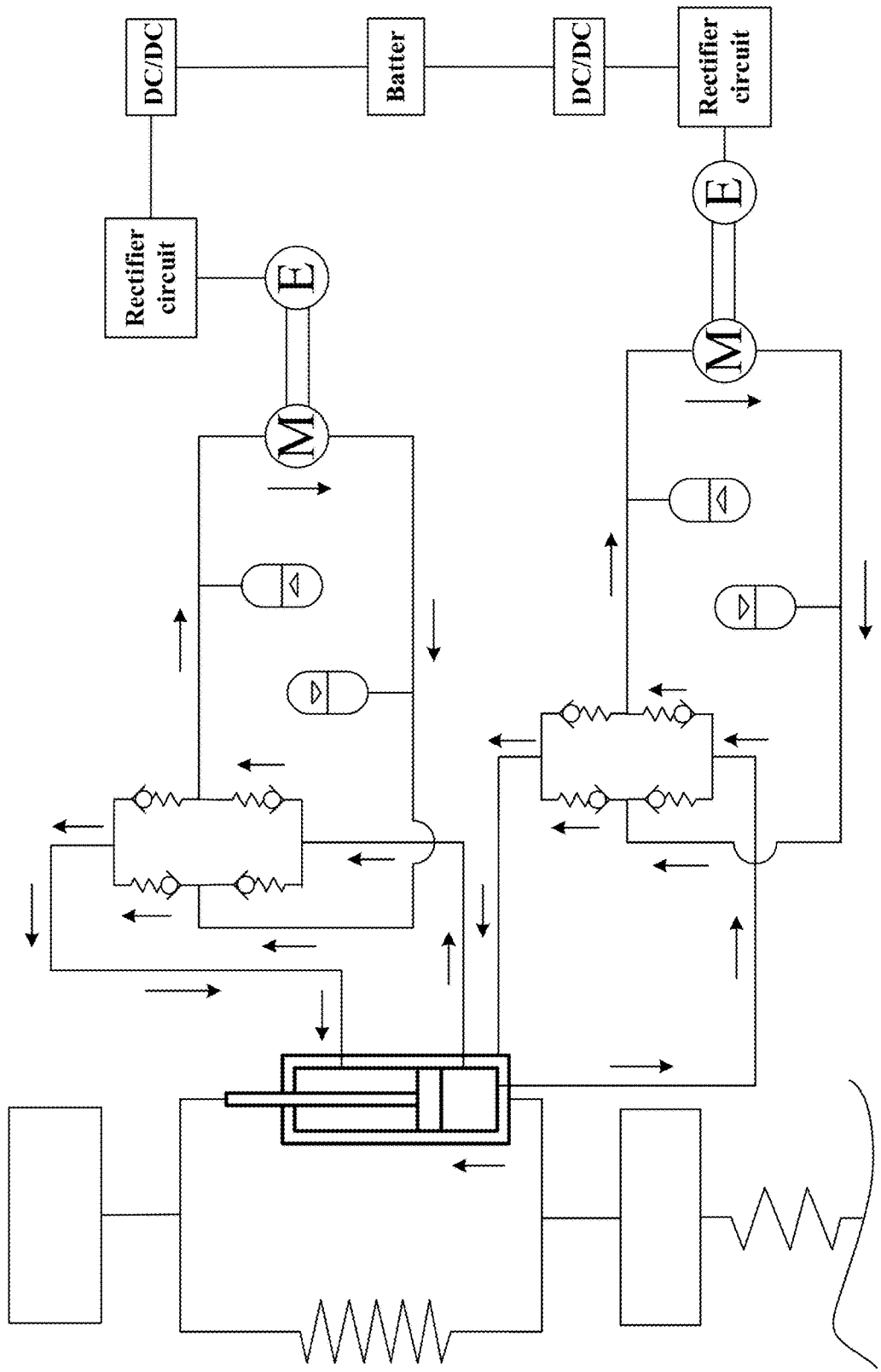
FIG. 7 is a working schematic diagram of the compression stroke system of the hybrid electromagnetic suspension.
Figure 8:
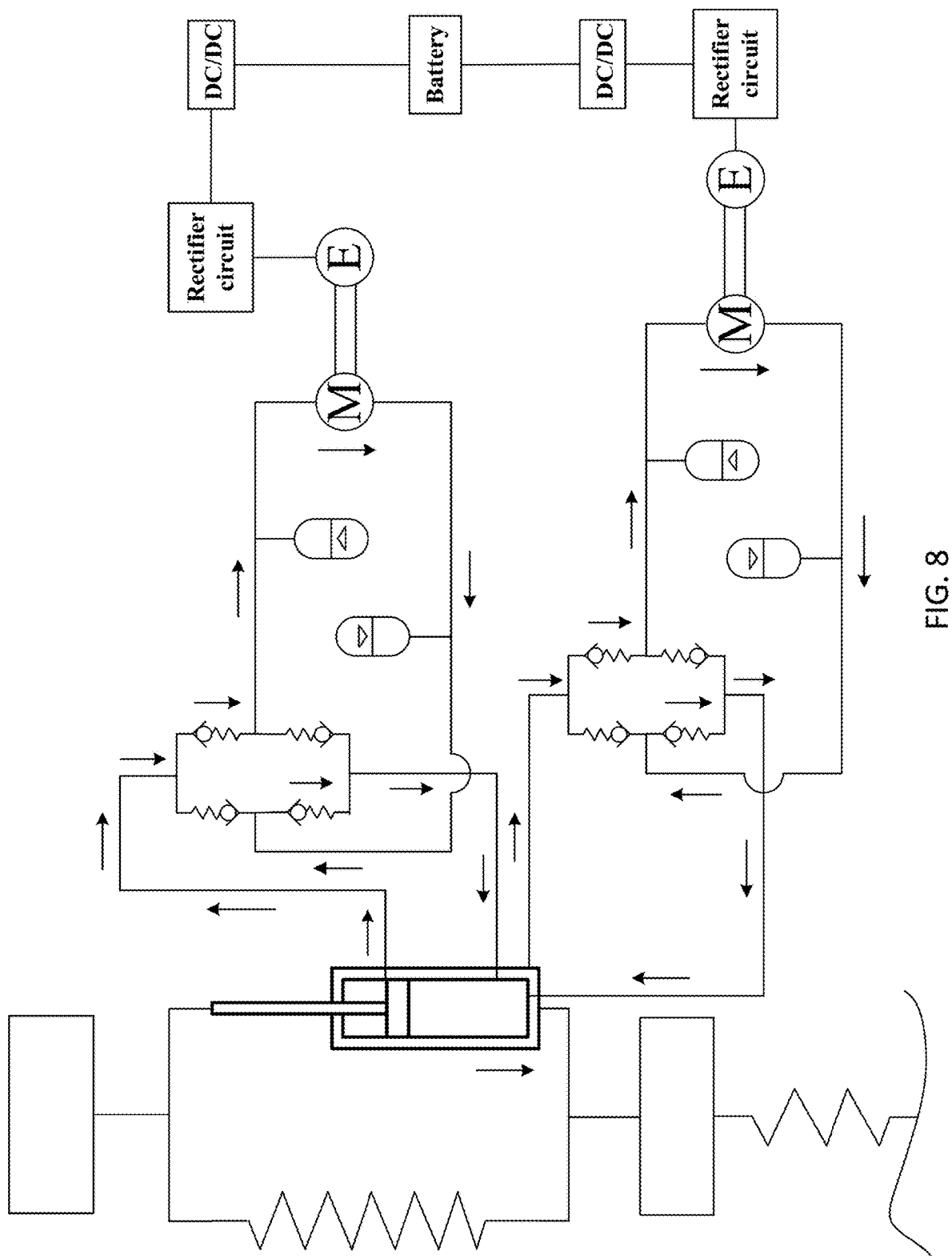
FIG. 8 is a working schematic diagram of the stretching stroke system of the hybrid electromagnetic suspension.

In the above solution, the criteria for judging the three modes are the current road level and its principle is as shown in FIG. 6. The acceleration sensor installed on the wheel and body inputs the collected acceleration signals of the wheel and body into the ECU. The ECU carries out a comprehensive analysis to determine the current road level according to the received acceleration signals and speed signals. If the detected road level is A-class or B-class, the suspension works in passive mode. As a result, the current is not applied to the three-phase winding of the linear motor, and the linear motor works in the generator mode. In this state, the linear motor compresses and stretches together with suspensions and recovers the vibration energy. Although the dynamic performance in this mode is consistent with that of passive suspension, it has good energy recovery performance. The working principle of the equivalent hydraulic damper is as follows:

When the suspension is in compression state under road impact, its working process is as shown in FIG. 7: the piston 19 is pressed down, and the oil is discharged from the lower chamber of the working cylinder 18. The fourth one-way valve 34 and the sixth one-way valve 49 are opened. A part of oil flows through the first rectifier bridge and the first accumulator 35 to drive the first hydraulic motor 37 to rotate, thus driving the first rotary motor 38 to rotate to generate electricity, and the electricity is stored in battery 41 through first rectifier circuit 39 and first boost circuit 40. The oil flows through the second accumulator 36, and the second one-way valve 32 is opened, the oil continues to flow into the upper chamber of the working cylinder 18. Another part of oil flows through the second rectifier bridge and the third accumulator 46 to drive the second hydraulic motor 45 to rotate, thus driving the second rotary motor 44 to rotate to generate electricity, and the electricity is stored in battery 41 through second rectifier circuit 43 and second boost circuit 42. The oil flows through the fourth accumulator 47, and the eighth one-way valve 51 is opened, the oil flows into the oil storage cylinder 17. When the suspension is in the stretching state, the direction of oil flow is opposite to that of compression state, and the working process is similar, as shown in FIG. 8. The first rotating motor 38 and the second rotating motor 44, while rotating to generate electricity, will obstruct the rotation of the hydraulic motor because of their driving resistance, thus causing resistance to the flow of oil. Therefore, the damping force of the corresponding hydraulic circuit can be adjusted by changing the resistance value of the external resistance of the two rotating motors. When the suspension is in compression state, the external resistance of the first rotary motor 38 is adjusted to the basic value (very small) to reduce its driving resistance, so as to reduce the resistance of the first hydraulic motor 37 to the oil. At this time, its function is equivalent to the "flow valve" in the traditional hydraulic shock absorber. At the same time, the external resistance of the second rotary motor 44 is adjusted to a maximum (very large) to increase its driving resistance, so as to increase the resistance of the second hydraulic motor 45 to oil. At this time, its function is equivalent to the "compression valve", and the output damping force is mainly produced by the "compression valve". When the suspension is in extended state, the external resistance of the first rotary motor 38 is adjusted to the maximum (very large) to increase its driving resistance, so as to increase the resistance of the first hydraulic motor 37 to the oil. At this time, its function is equivalent to the "extension valve" in the traditional hydraulic damper. At the same time, the external resistance of the second rotary motor 44 is adjusted to the basic value (very small) to reduce its driving resistance, so as to reduce the resistance of the second hydraulic motor 45 to oil. At this time, its function is equivalent to the "compensation valve", and the output damping force is mainly produced by the "extension valve". The external resistance of two rotating motors can be continuously adjusted, in which the basic value corresponds to the small resistance in passive mode and the maximum value corresponds to the large resistance.

In the above solution, when ECU judges that the driving road is C-class road, suspension works in semi-active mode, and the modified skyhook control strategy is adopted:

According to the received real-time vehicle status, the skyhook control force to be output is calculated and the damping needs to be provided by the equivalent hydraulic damper is deduced, both through the ECU. Then, by adjusting the corresponding external resistance of the two rotating motors, the damping value of the equivalent hydraulic damper can be changed in real time, so that the semi-active control can be realized. The larger the damping value required, the larger the external resistance of the corresponding rotary motor. On the contrary, the smaller the damping value required, the smaller the external resistance value of the corresponding rotary motor. During the whole semi-active control process, the linear motor works in the generator state, does not provide the active force, and moves with the suspension to recover the vibration energy. In this mode, not only the ride comfort of the vehicle is improved, but also the vibration energy is recovered, which makes the suspension have a good comprehensive performance.

In the above solution, when ECU judges that the driving road is D-class, E-class or F-class road, suspension works in active mode, and the road adaptive control method is adopted:

The road adaptive controller receives the road level signal from comprehensive analysis of ECU, switches to the corresponding modified skyhook controller according to the road level. The modified skyhook controller calculates the output force of the actuator according to the real-time state of the vehicle detected by the sensors, and controls the linear motor to track the skyhook damping force and controls equivalent hydraulic damper to track the passive damping force, so as to realize the active control. Because the modified skyhook controller is designed according to the corresponding road level and control target, thus in this mode, the optimal dynamic performance of hybrid electromagnetic suspension can be ensured under different road conditions.

The road identification methods described in the above solution are as follows:

The vertical acceleration of vehicle body is measured during driving, by acceleration sensor built in the vehicle suspension system. Then the power spectral density of road is calculated based on the vehicle model theory. By deducing the relationship between pavement power spectral density and international smoothness index, the corresponding road roughness can be obtained. The data measured by this system are the body vertical acceleration, based on which the vertical power spectral density (recorded as $PSD_{ACC}$) is calculated. To get the road roughness information, we need to get the power spectral density of road (recorded as $PSD_{ROAD}$). The relationship between the two can be obtained by the transfer function, and the transfer relationship is shown in FIG. 9.

Figure 9:
FIG. 9 is a transfer diagram of input and output.

The calculation method of the power spectral density of road can be obtained from FIG. 9:

$$PSD_{ROAD}(\omega) = PSD_{ACC}(\omega) \cdot H(\omega)$$

The transfer function $H(\omega)$ is derived from the ¼ vehicle model. Here, the passive suspension is taken as an example:

(1) Dynamic differential equation of ¼ vehicle is:

$$\begin{cases} m_2\ddot{x}_2 = -k_2(x_2 - x_1) - c(\dot{x}_2 - \dot{x}_1) \\ m_1\ddot{x}_1 = k_2(x_2 - x_1) - k_1(x_1 - x_0) + c(\dot{x}_2 - \dot{x}_1) \end{cases}$$

Fourier transform is applied to the above formulas and the amplitudes of each complex frequency are introduced:

$$\begin{cases} x_2(-\omega^2 m_2 + j\omega c + k_2) = x_1(j\omega c + k_2) \\ x_1(-\omega^2 m_1 + j\omega c + k_1) = x_2(j\omega c + k_2) + x_0 k_1 \end{cases}$$

From the above formula, it can be concluded that the modulus of the transfer function is:

$$|H(\omega)| = \omega^2 \left| \frac{k_1(j\omega c + k_2)}{(-\omega^2 m_2 + j\omega c + k_2)(-\omega^2 m_1 + j\omega c + k_1) - (j\omega c + k_1)(j\omega c + k_2)} \right|$$

The power spectral density of road can be calculated from the above formulas.

(2) Relationships Between PSD (Power Spectral Density) and IRI (International Roughness Index)

After derivation, the relationship between PSD and standard deviation of smoothness is easily deduced:

$$\sigma = \sqrt{2\int_0^\infty |H(f)|^2 PSD_{ROAD}(\omega) d\omega}$$

Considering the relationship between IRI and $\sigma$ obtained from the Institute of Highway Science, Ministry of Communications of China is as follows:

$$IRI = \frac{\sigma - 0.013}{0.5926}$$

The relationships between PSD and IRI can be obtained:

$$IRI = \frac{\sqrt{2\int_0^\infty |H(f)|^2 PSD_{ROAD}(\omega)} - 0.013}{0.5926}$$

Figure 10:
FIG. 10 is a schematic diagram of road identification.

Based on the above formulas, the obtained PSD of road can be transferred to the IRI. Then, by comparing with the range of road roughness index in the road roughness classification table, the roughness level of the driving road can be judged, and the whole process is shown in FIG. 10.

The road adaptive control method mentioned in the above solution is as follows:

Road adaptive control is essentially an improved skyhook control under different road conditions, and the active control by suspension is only taken under poor road conditions, mainly D-class, E-class and F-class road level. Thus, the road adaptive control is mainly designed for these three road levels. Because the design methods of controller under the three road levels are similar, the design process of modified skyhook controller under D-class road is taken as an example to illustrate the design process of road adaptive controller.

1) Establishment of ¼ Vehicle Suspension Model $$\begin{cases} m_2\ddot{x}_2 = -k_2(x_2 - x_1) + F \\ m_1\ddot{x}_1 = k_2(x_2 - x_1) - k_1(x_1 - x_0) - F \end{cases}$$

where, $m_2$ is the sprung mass; $m_1$ is the unsprung mass; $k_2$ is the spring stiffness; $k_1$ is the tire stiffness; $x_0$, $x_1$, $x_2$ are the road input, vertical displacement of unsprung mass and vertical displacement of sprung mass respectively; F is the output force of the actuator (including linear motor and equivalent hydraulic damper), when modified skyhook control is adopted, which can be expressed as:

$$F = \begin{cases} -c_s \cdot \dot{x}_2 - c_p(x_2 - x_1) & \dot{x}_2 \cdot (\dot{x}_2 - \dot{x}_1) \leq 0 \\ -c_p(x_2 - x_1) & \dot{x}_2 \cdot (\dot{x}_2 - \dot{x}_1) > 0 \end{cases}$$

where, $c_s$ is the skyhook damping coefficient; $c_p$ is the passive damping coefficient.

2) Determination of the Parameters of Controller

Figure 11:
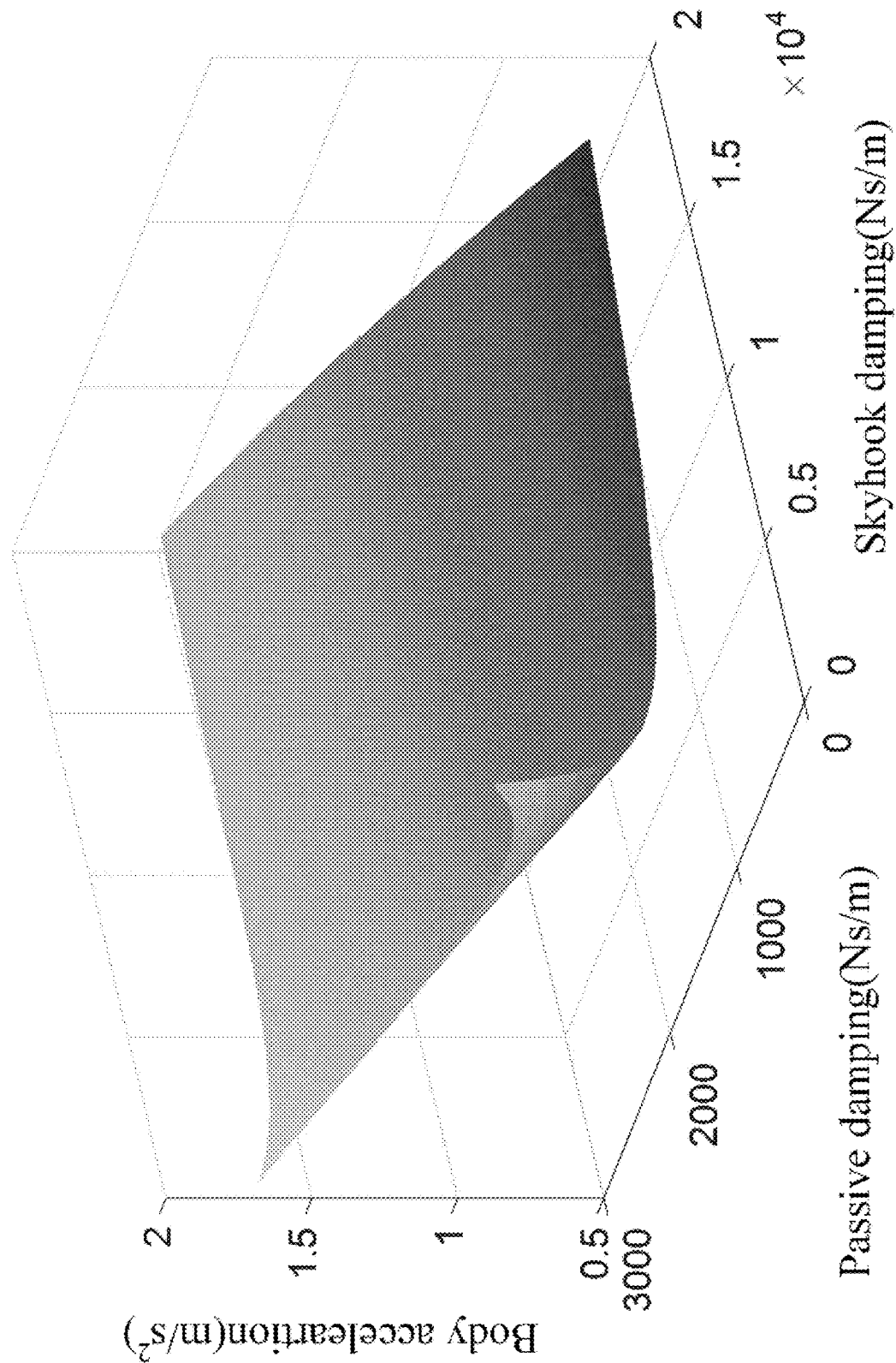
FIG. 11 shows a diagram of the influence of skyhook damping $c_s$ and passive damping $c_p$ on body acceleration.
Figure 12:
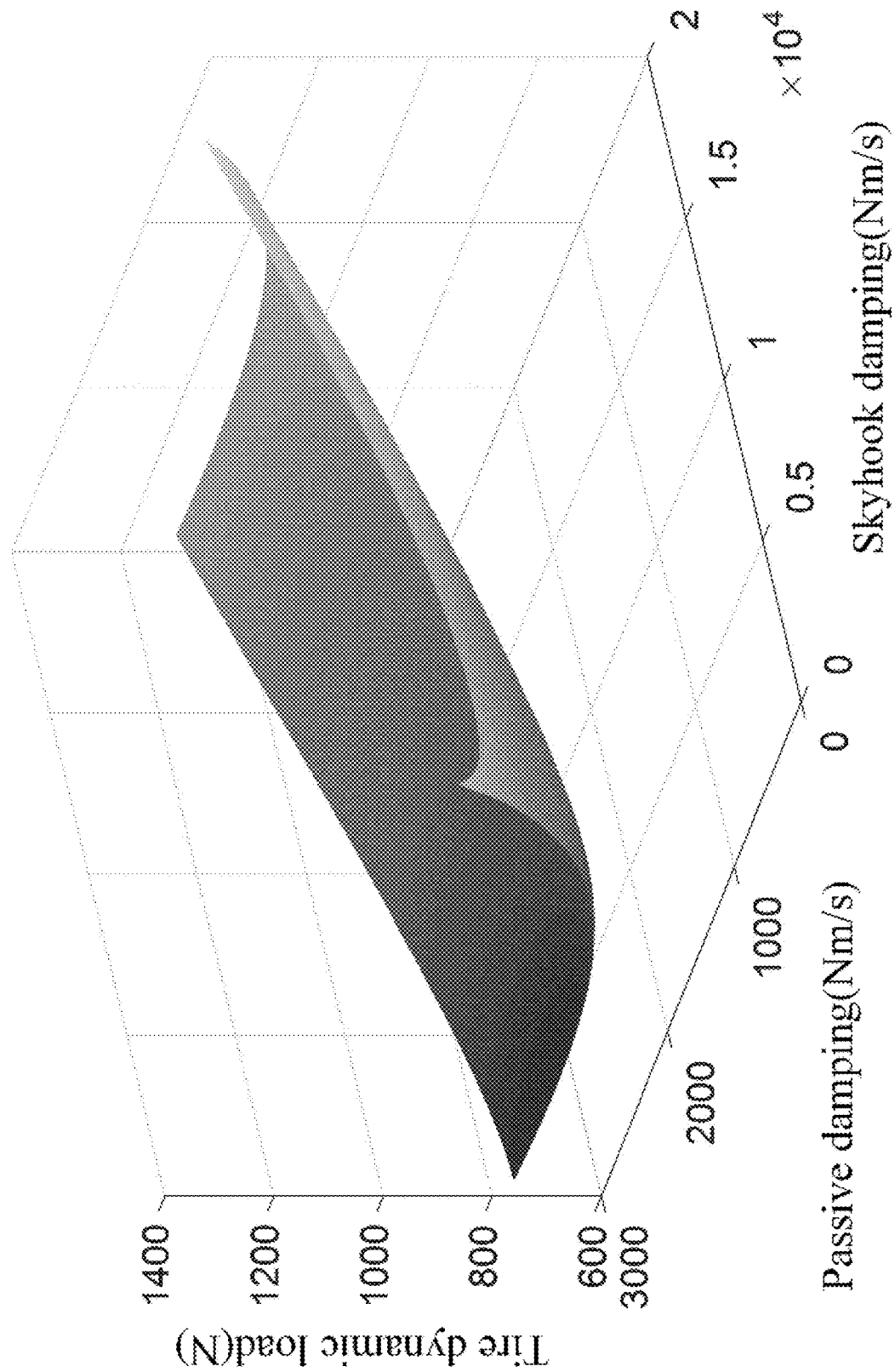
FIG. 12 shows a diagram of the influence of skyhook damping $c_s$ and passive damping $c_p$ on the dynamic tire load.
Figure 13:
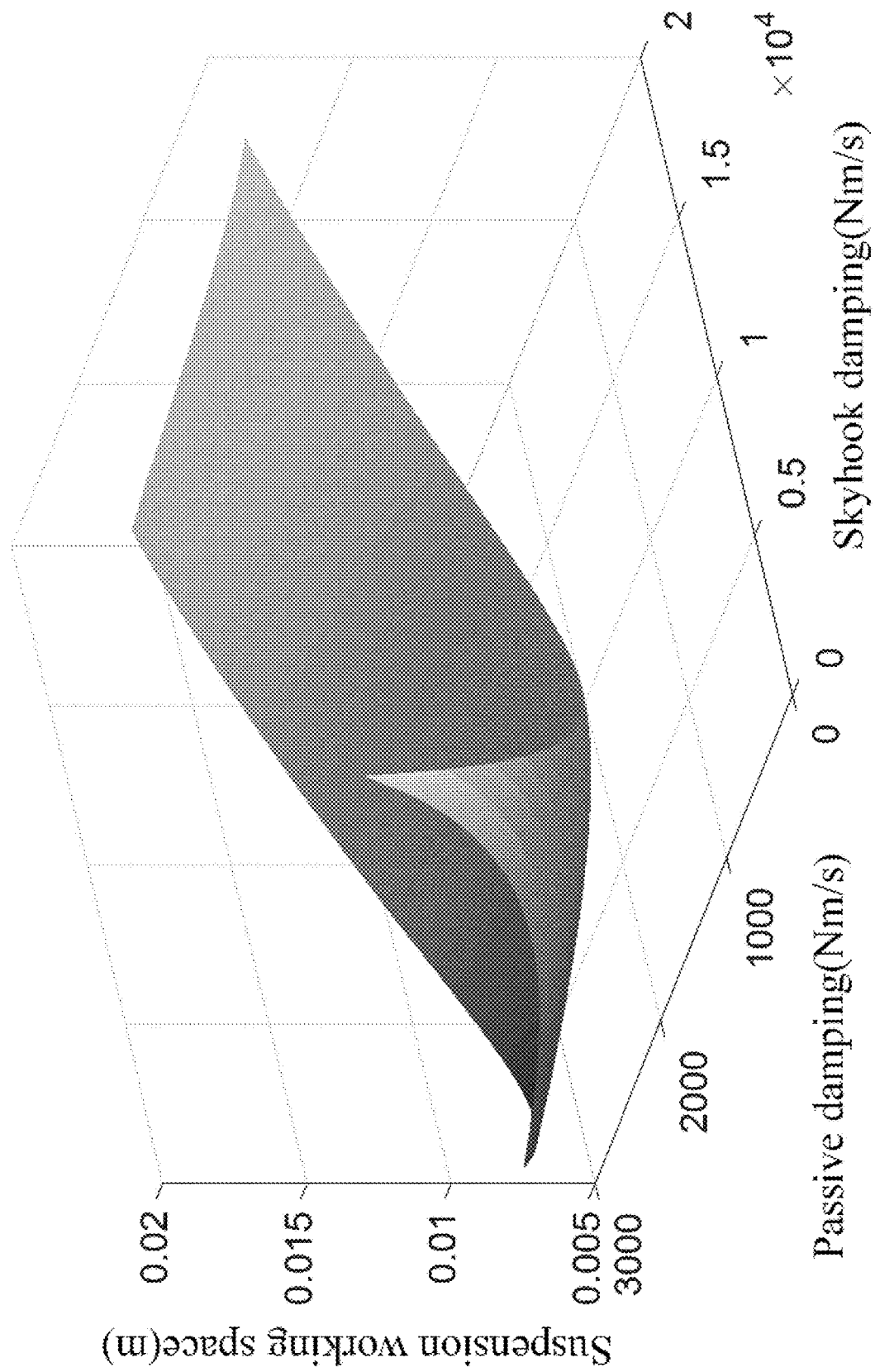
FIG. 13 shows a diagram of the influence of skyhook damping $c_s$ and passive damping $c_p$ on the suspension working space.

Selecting different $c_s$ and $c_p$ values can obtain different suspension performances, and the influence of $c_s$ and $c_p$ values on the suspension performance is as shown in FIGS. 11 to 13. It can be seen from the figures that under the condition of ensuring that the suspension will not impact the limit block, increasing the skyhook damping or reducing the passive damping can improve ride comfort, but reducing the skyhook damping and increasing the passive damping can improve the road holding performance, which is contradictory. To satisfy the requirement of suspension performance under different working conditions, the weighted coefficients $w_t$ and $w_a$ are introduced to form the comprehensive evaluation index J:

$$(C_s, C_p)_{optimal} = J = \min$$
$$\left\{ \sqrt{\left[w_t\left(\frac{rms(f) - rms(f)_{min}}{rms(f)_{max} - rms(f)_{min}}\right)\right]^2 + \left[w_a\left(\frac{rms(a) - rms(a)_{min}}{rms(a)_{max} - rms(a)_{min}}\right)\right]^2} \right\}$$

where, rms(a) is the root mean square value of body acceleration; rms(f) is the root mean square value of dynamic tire load; $rms(a)_{min}$ and $rms(a)_{max}$ are the minimum value and maximum value of the root mean square value of body acceleration respectively; $rms(f)_{min}$ and $rms(f)_{max}$ are the minimum value and maximum value of the root mean square value of dynamic tire load respectively. With the increasing of $w_t$, the weight of dynamic tire load in the comprehensive evaluation index will increase, and better handling stability will be obtained. With the increasing of $w_a$, the weight of body acceleration in the comprehensive evaluation index will increase, and better ride comfort will be obtained. Through adjusting the values of $w_t$ and $w_a$, the optimal comprehensive performance under different road conditions can be obtained. For example, under the D-class road, the better handling stability is preferred to be obtained. Thus, $w_t=0.7$ and $w_a=0.3$ are selected. Through genetic algorithm, the skyhook damping coefficient $c_s$ and passive damping coefficient $c_p$, which make the comprehensive evaluation index J the smallest, can be calculated. Setting them as the controller parameters of the corresponding road condition, so that the optimal vehicle performance is realized. The weighted coefficients under different road levels are as shown in Table 1. The resistance needs to be provided by the external resistance can be calculated according to the obtained passive damping coefficient $c_p$.

TABLE 1

Weighted coefficients under different road levels

| Road level | $W_t$ | $W_a$ |
|---|---|---|
| D | 0.7 | 0.3 |
| E | 0.6 | 0.4 |
| F | 0.4 | 0.6 |

Through the above methods, the controller parameters and corresponding external resistances under E-class and F-class road can be obtained, respectively. By presetting, the design of road adaptive controller in the active mode is completed.

The beneficial effect of adopting this invention is that the working mode is divided according to the road level and the corresponding controllers are designed, so that the suspension performance under different working conditions is improved. The road conditions can be detected in real time during vehicle driving. When the road level is A-class or B-class, i.e. the road condition is better, the suspension works in passive mode and the system has good energy recovery performance; when the road level is C-class, i.e. road condition is slightly worse, the suspension works in semi-active mode, which can not only improve the ride comfort of vehicles, but also realize energy recovery, and system has good comprehensive performance; when the road level is C-class, D-class or E-class, i.e. the road condition is worse, the suspension works in active mode, the system has excellent dynamic performance. No matter the suspension works in "passive", "semi-active" or "active" mode, the hydraulic oil in the pipeline always drives the hydraulic motor to rotate, thus driving the rotary motor to rotate and generate electricity. By synthesizing the vibration energy recovered by the linear motor, the system can realize self-powering.

The present invention not only solves the problem that the parameters of passive suspension cannot be adjusted, but also solves the problem of large energy consumption of active suspension. The working mode of suspension can be selected according to the requirements of driving conditions. And the suspension system has Fail-Safe characteristics because of the parallel structure of linear motor and equivalent hydraulic damper. Its control mechanism is simple in structure and has beneficial engineering application value.

The described embodiment is the preferred embodiment of the present invention, but the present invention is not limited to the above embodiment. Without departing from the essence of the present invention, any obvious improvement, replacement or variant that the person skilled in the art can make belongs to the protection scope of the present invention.

The invention claimed is:

1. A control method of a hybrid electromagnetic suspension capable of self-powering, which divides three suspension working modes: passive mode, semi-active mode and active mode, according to the performance requirements of vehicles under different road levels, wherein,
   1) when the detected road level is A-class or B-class, the hybrid electromagnetic suspension works in the passive mode;
   2) when the detected road level is C-class, the hybrid electromagnetic suspension works in the semi-active mode;
   3) when the detected road level is D-class, E-class or F-class, the hybrid electromagnetic suspension works in the active mode; and
wherein, the road level is obtained by calculating the International Roughness Index (IRI), and then by comparing with the classification table of road roughness index, the calculation method of IRI is as follows:
International Roughness Index:

$$IRI = \frac{\sqrt{2\int_0^\infty |H(f)|^2 PSD_{ROAD}(\omega)} - 0.013}{0.5926}$$

$$PSD_{ROAD}(\omega) = PSD_{ACC}(\omega) \cdot H(\omega)$$

$$|H(\omega)| = \omega^2 \left| \frac{k_1(j\omega c + k_2)}{(-\omega^2 m_2 + j\omega c + k_2)(-\omega^2 m_1 + j\omega c + k_1) - (j\omega c + k_1)(j\omega c + k_2)} \right|$$

wherein,
   $PSD_{ROAD}$ is the power spectral density of road;
   $PSD_{ACC}(\omega)$ is the power spectral density of body acceleration;
   $H(\omega)$ is the transfer function from road input to body acceleration;

(ω) is circumferential frequency;
$m_2$ is the sprung mass;
$m_1$ is the unsprung mass;
$k_2$ is spring stiffness;
$k_1$ is tire stiffness;
c is the damper coefficient of shock absorber.

2. The control method of a hybrid electromagnetic suspension capable of self-powering according to claim 1, wherein, in the active mode, the dynamic performance of the vehicle is satisfied by adaptive switching of the skyhook controller, according to the detected real-time road level.

3. The control method of a hybrid electromagnetic suspension capable of self-powering according to claim 2, wherein, the process of the adaptive switching of the skyhook controller is:

1) establishing ¼ vehicle suspension model $$\begin{cases} m_2\ddot{x}_2 = -k_2(x_2 - x_1) + F \\ m_1\ddot{x}_1 = k_2(x_2 - x_1) - k_1(x_1 - x_0) - F \end{cases}$$

wherein,
$m_2$ is the sprung mass;
$m_1$ is the unsprung mass;
$k_2$ is spring stiffness;
$k_1$ is tire stiffness;
$x_0$, $x_1$, $x_2$ are the road input, vertical displacement of unsprung mass and vertical displacement of sprung mass respectively;
F is the output force of actuator including linear motor and equivalent hydraulic damper, when the modified skyhook control is adopted, which can be expressed:

$$F = \begin{cases} -c_s \cdot \dot{x}_2 - c_p(x_2 - x_1) & \dot{x}_2 \cdot (\dot{x}_2 - \dot{x}_1) \leq 0 \\ -c_p(x_2 - x_1) & \dot{x}_2 \cdot (\dot{x}_2 - \dot{x}_1) > 0 \end{cases}$$

wherein,
$c_s$ is the skyhook damping coefficient;
$c_p$ is the passive damping coefficient;

2) determining the parameters of the skyhook controller different suspension performances can be obtained by choosing different skyhook damping coefficient $c_s$ and passive damping coefficient $c_p$, to satisfy the performance requirements under different road levels, the weighted coefficient of handling performance $w_t$ and the weighted coefficient of ride comfort $w_a$ are introduced, with the increase of $w_t$, the weight of dynamic tire load in the comprehensive evaluation index increases, and the better handling performance can be obtained, with the increase of the $w_a$, the weight of body acceleration in the comprehensive evaluation index increases, and the better ride comfort can be obtained;

$$(C_s, C_p)_{optimal} = J = \min$$

$$\left\{ \sqrt{\left[ w_t \left( \frac{rms(f) - rms(f)_{min}}{rms(f)_{max} - rms(f)_{min}} \right) \right]^2 + \left[ w_a \left( \frac{rms(a) - rms(a)_{min}}{rms(a)_{max} - rms(a)_{min}} \right) \right]^2} \right\}$$

wherein,
rms(a) is the root mean square value of body acceleration;
rms(f) is the root mean square value of dynamic tire load;
$rms(a)_{min}$ and $rms(a)_{max}$ are the minimum value and maximum value of the root mean square value of body acceleration respectively;
$rms(f)_{min}$ and $rms(f)_{max}$ are the minimum value and maximum value of the root mean square value of dynamic tire load respectively;
according to the requirements of different road levels for vehicle performance, the comprehensive evaluation index J under the corresponding performance requirements can be formed by adjusting the values of $w_t$ and $w_a$, through optimization algorithm, the parameters of the skyhook controller under the corresponding road level including the skyhook damper coefficient $c_s$ and passive damper coefficient $c_p$, which make the comprehensive evaluation index J the smallest i.e. the corresponding vehicle performance optimal, are obtained.

* * * * *